(12) United States Patent
Lomax, Jr. et al.

(10) Patent No.: US 7,727,305 B2
(45) Date of Patent: Jun. 1, 2010

(54) METHOD AND SYSTEM FOR ATMOSPHERE RECYCLING

(75) Inventors: Franklin D. Lomax, Jr., Arlington, VA (US); Gregory S. Carr, Humble, TX (US); Richard S. Todd, Annandale, VA (US)

(73) Assignee: Lummus Technology Inc., Bloomfield, NJ (US)

( * ) Notice: Subject to any disclaimer, the term of this patent is extended or adjusted under 35 U.S.C. 154(b) by 985 days.

(21) Appl. No.: 11/407,058

(22) Filed: Apr. 20, 2006

(65) Prior Publication Data

US 2007/0245698 A1 Oct. 25, 2007

(51) Int. Cl.
*B01D 50/00* (2006.01)

(52) U.S. Cl. ............................. 95/8; 55/340; 55/385.2; 95/19; 95/22; 95/45; 95/96; 95/267; 96/4; 96/112; 96/116; 96/121; 96/128; 96/421; 96/422

(58) Field of Classification Search ............... 95/41, 95/45, 47, 53, 54, 128, 131, 142, 149, 8, 95/19, 22, 96, 267; 96/4, 7, 108, 112, 116, 96/121, 128, 421, 422; 55/385.2, 340
See application file for complete search history.

(56) References Cited

U.S. PATENT DOCUMENTS

| | | | | |
|---|---|---|---|---|
| 3,251,652 A | | 5/1966 | Pfefferle | |
| 3,922,150 A | * | 11/1975 | Yusa et al. | 95/96 |
| 4,400,183 A | * | 8/1983 | Henrich et al. | 95/180 |
| 4,472,176 A | | 9/1984 | Rubin | |
| 5,759,237 A | * | 6/1998 | Li et al. | 95/41 |
| 7,258,725 B2 | | 8/2007 | Ohmi et al. | |
| 2006/0107831 A1 | * | 5/2006 | Karwacki et al. | 95/116 |

* cited by examiner

*Primary Examiner*—Duane Smith
*Assistant Examiner*—Minh-Chau T Pham
(74) *Attorney, Agent, or Firm*—Oblon, Spivak, McClelland, Maier & Neustadt, L.L.P.

(57) ABSTRACT

A system for recycling vented atmosphere gas discharged from a heat treatment chamber utilizing a protective atmosphere gas therein. The system includes an atmosphere recycling apparatus configured to receive the vented atmosphere gas. The atmosphere recycling apparatus includes a gas separator configured to separate the vented atmosphere gas into a purified atmosphere gas stream and an impure stream. The atmosphere recycling apparatus is configured to feed the purified atmosphere gas stream to the heat treatment chamber. A storage vessel can be provided to receive the purified atmosphere gas stream from the atmosphere recycling apparatus, and configured to supplement an atmosphere gas supply to the heat treatment chamber with the purified atmosphere gas stream.

58 Claims, 6 Drawing Sheets

METHOD AND SYSTEM FOR ATMOSPHERE RECYCLING

BACKGROUND OF THE INVENTION

1. Field of the Invention

The present invention relates to recycling of vented atmosphere gas discharged from a heat treatment chamber utilizing a protective atmosphere gas therein.

2. Discussion of the Background

Metal parts are typically heat treated during the manufacturing process in order to achieve desired characteristics of the metal parts. Heat treating is usually conducted in a protective atmosphere in order to prevent adverse chemical reactions such as oxidation, carburization, hydrogen embrittlement, or nitriding. For most applications, an atmosphere that is chemically inert (e.g., argon, nitrogen for some metals) or chemically reducing (especially atmospheres that are partially or wholly hydrogen) is preferred. Hydrogen annealing, in particular, presents special advantages, as hydrogen has substantially better heat transfer properties and lower viscosity than other gases, and thus has allowed the development of the present state of the art high convection, bell annealing furnaces that mechanically circulate a hydrogen atmosphere around the metal being heat-treated to achieve even heating and freedom from chemical side reactions.

Since metals to be annealed have usually been mechanically-processed with oil lubricant, with or without subsequent washing, there is generally a large amount of contaminant in the form of oil and/or water present on the metal. Naturally, the annealing atmosphere is also initially inundated with atmospheric air, which contains oxygen, nitrogen and carbon dioxide in large amounts, all of which can cause undesirable chemical reactions as the metal is heated to the desired temperature for annealing, stress relief, etc. In present heat treatment facilities, the atmospheric air is displaced by a first purging gas, which may or may not be the final atmosphere gas, in order to displace the air and some vapour contaminants. Safety usually dictates that this first purging gas is not flammable. Alternatively, a mild vacuum may be applied in alone or in combination with inert gas to achieve the same ends.

As the metal is heated, the first purging gas may be continuously added to carry away evaporating oils and water, and prevent the admission of air, or a second atmosphere (usually hydrogen) may be introduced. Because the level of hydrocarbon, carbon oxide, nitrogen and water vapour impurities otherwise rises in the furnace atmosphere as the liquid materials vaporize and chemically decompose, the atmosphere is continuously removed from the heat treating furnace. Some commonly used strategies for disposing of the atmosphere gas are combustion at the vent (often referred to as "flame curtains"), collection and combustion as low-value fuel, or simply venting the atmosphere.

These methods of removing the impurities from the heat treating atmosphere suffer several drawbacks. Foremost is that these methods are wasteful of the atmosphere gas itself, which is usually costly. Even if recovered as a fuel, the fuel value of the recovered atmosphere gas is usually far lower than the cost of the pure atmosphere gas that is consumed. In the case of venting the atmosphere gas, the volatile organic compounds and carbon monoxide impurities in the gas are then dispersed in the ambient air, and form air pollution. At many locations, the emission of such pollutants is regulated, and extra emissions may be strictly prohibited, requiring the addition of expensive post-treatment equipment, such as thermal or catalytic oxidizers.

Methods to recycle metal treating atmospheres have been proposed. For example, U.S. Pat. No. 6,881,242 (hereinafter referred to as "the '242 patent") to Krueger et al., proposes a system for hydrogen recycle where atmosphere gas is filtered, compressed, then supplied to a metal membrane hydrogen purifier. This method is limited in several respects. Because atmosphere gas is usually very hot, it is impractical to compress this gas to the pressures required in the '242 patent unless very small flows are contemplated. Further, the '242 patent provides no means for oil vapour removal before the separation step, meaning that the separator must operate while exposed to the mixed oil and contaminants from the decomposed metal forming oil, rinse solution, etc. Metal membrane purifiers are very sensitive to poisoning by sulphur, carbon deposition, etc., and thus are not usable for typical furnace atmospheres containing such compounds.

U.S. Pat. No. 5,348,592 (hereinafter referred to as "the '592 patent") to Garg et al., presents another atmosphere recycling approach which is useful for removing water vapour and oxygen impurities only. Like the '242 patent, the '592 patent suggests that an adsorption gas dryer may be used to remove water vapor. In the case of the '592 patent, this water vapour is actually formed by catalytic reaction of trace oxygen with hydrogen as well as through pre-existing water vapour from the vented atmosphere gas. The catalysts used in the '592 patent are also very sensitive to deactivation by hydrocarbon vapors, by sulphur present in metalworking oils, and by carbon monoxide. Thus, the method of the '592 patent is not suitable for metallurgical atmospheres where these impurities are present. The '592 process is also incapable of ridding the vented atmosphere gas of unwanted inerts such as nitrogen, so is not capable of use when the atmosphere being recycled is desirably free of nitrogen, as in argon or hydrogen atmospheres.

Neither the '242 patent nor the '592 patent provide a means for excluding vented atmosphere gas during periods when impurity levels are such that they can not be effectively removed by the purification apparatus. Thus, during such periods, the vented atmosphere gas may cause equipment degradation or malfunction, or result in the recycle of substantial impurities to the heat treatment atmosphere.

SUMMARY OF THE INVENTION

In an effort to eliminate the limitations and problems discussed above, the inventors have constructed a method and system for heat treatment atmosphere recycling as described below.

For the reasons discussed above, it is desirable to provide a method and apparatus for recycling purified atmosphere gas from impure vented gas typical of heat treating applications.

It is further desirable to greatly reduce the emission of volatile organic compounds from the heat treatment process.

It is further desirable to provide a method and apparatus which is able to handle widely-varying flowrates and compositions of vented gas from either a single heat treating furnace or a number of heat treating furnaces operated either in or out of phase with respect to their usage of atmosphere gas.

It is further desirable to provide a method for selectively-recovering atmosphere gas during periods to independently maximize recovery and purity of the recycled gas.

It is further desirable to provide an atmosphere gas recycle system which is capable of simultaneously removing water vapour, nitrogen, oxygen, volatile organics, carbon oxides and sulphur compounds from the recycled atmosphere gas without degradation.

It is further desirable to provide an atmosphere gas recycle system which can maintain an essentially-constant purity level in the recycled atmosphere gas despite flowrate, temperature, and composition variation in the vented atmosphere.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
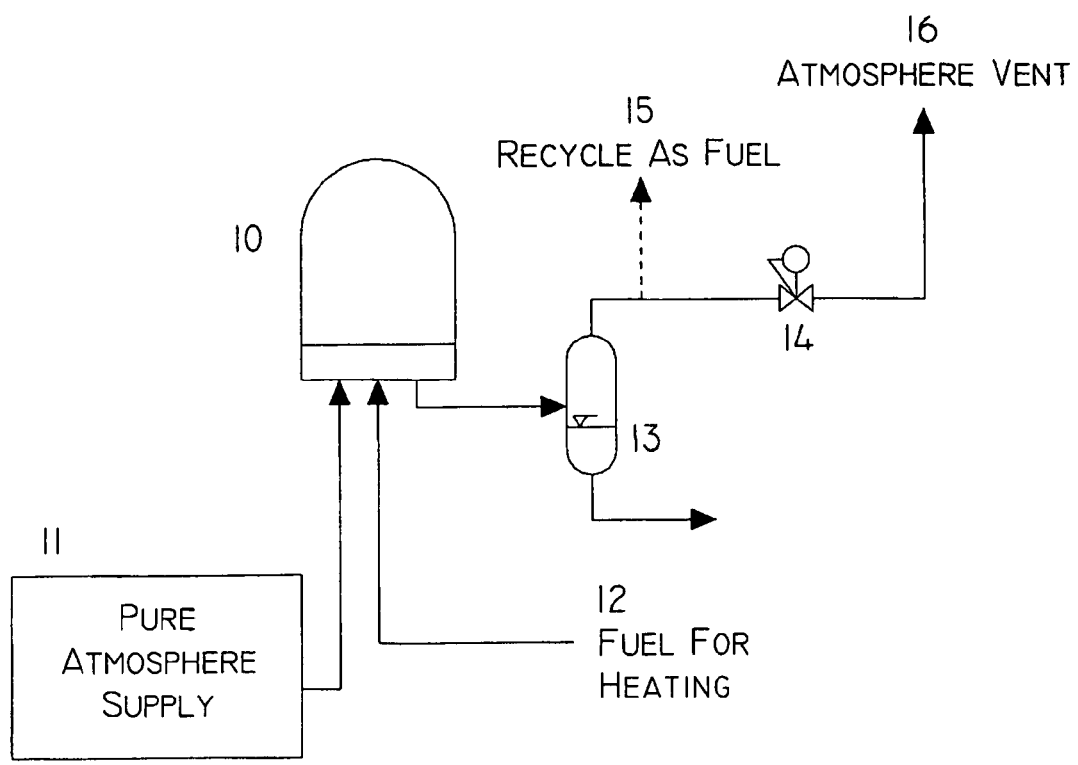
FIG. 1 is a schematic flow diagram of a heat treating apparatus provided with a protective gaseous atmosphere.

Embodiments of the present invention will be described hereinafter with reference to the accompanying drawings. In the following description, the constituent elements having substantially the same function and arrangement are denoted by the same reference numerals, and repetitive descriptions will be made only when necessary.

FIG. 1 depicts a heat treatment furnace 10 that is supplied with a protective atmosphere gas from gas supply 11. The heat treatment furnace 10 is also supplied with heat by combustion of fuel 12, or alternatively can be electrically heated. The protective atmosphere is exhausted from the furnace 10 and can be passed through an oil separation drum 13, which is provided with a device for condensed oil removal. The gas leaves the oil separation drum 13 and optionally passes through a back pressure or non-return valve 14, which prevents the ingress of atmospheric air. A portion of the vented atmosphere gas can be recycled as fuel via conduit 15. This recycle conduit 15 is depicted as being connected before the back-pressure valve 14, but it is understood that the withdrawal of vented atmosphere as fuel can occur anywhere in the system. Finally, the vented atmosphere is connected to an atmospheric vent 16. During operation, the vented atmosphere gas can be extremely hot, in excess of 300° F., and oil condensation can be very low. During these periods, vaporized hydrocarbons are carried downstream, and can be vented through the atmospheric vent 16.

Figure 2:
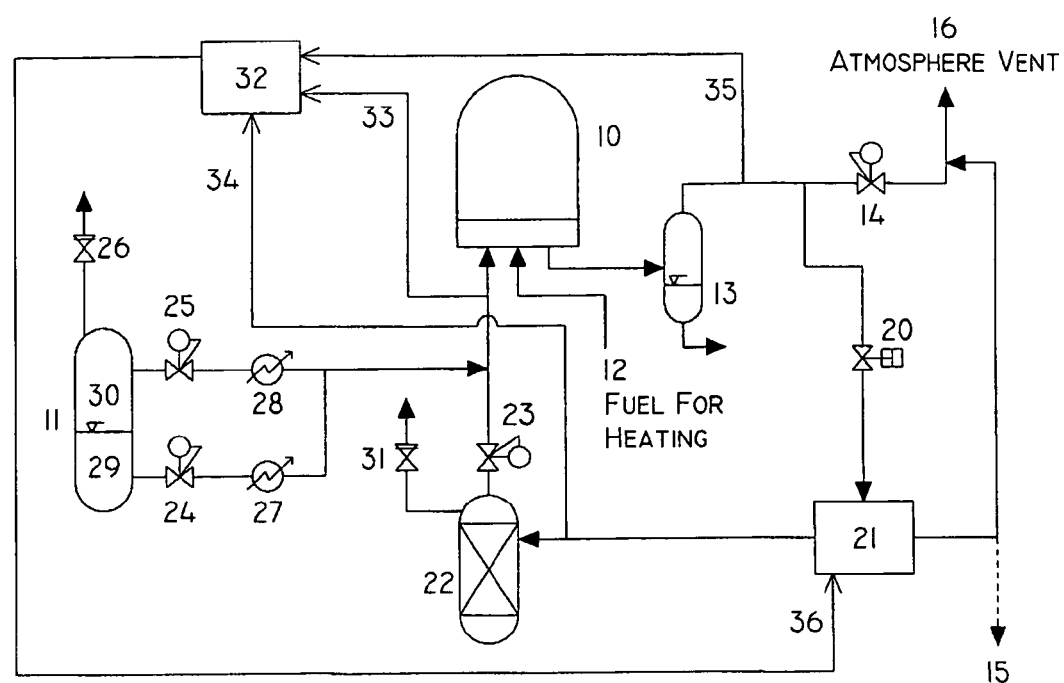
FIG. 2 is a schematic flow diagram of a heat treating apparatus provided with a protective gaseous atmosphere connected to an atmosphere recycling apparatus.

FIG. 2 depicts the heat treatment furnace 10 in connection with the fuel supply 12, oil separator 13, backpressure valve 14, and atmospheric vent 16. The furnace is also still equipped with an atmosphere gas supply 11, here depicted as a cryogenic, liquefied gas storage tank used to store hydrogen, argon and/or nitrogen. Although a single atmosphere gas tank 11 is shown, separate tanks can be supplied for inert purging atmosphere and reducing atmosphere such as hydrogen. Alternatively, any of these gases can be supplied as a delivered gas at ambient temperature and high pressure. Further, one or more atmosphere gases can be generated onsite, such as through nitrogen generation by permselective membrane or Pressure Swing Adsorption (PSA), or hydrogen supply through electrolysis, steam reforming of hydrocarbons, catalytic dissociation of ammonia or other means known to one skilled in the art of atmosphere generation.

FIG. 2 also depicts an actuated valve 20, which is in fluid communication with the atmosphere vent piping. If several heat treating furnaces 10 are operated in an array, they can each be provided with an oil separator 13, backpressure valve 14 and atmospheric vent 16. Alternatively, they can all be connected to common assemblies providing these functions. Further, one or more of the functional elements may not be present in a given installation. In practice, at least one valve 20 can then be installed in fluid communication with the vented atmosphere gas, selectively permitting fluid communication between the atmosphere and the atmosphere recycling apparatus 21. An alternate embodiment of the valve 20 includes a diverter valve means that causes all of the vented atmosphere from the furnace 10 to pass through the recycling apparatus 21, with no flow directly to the vent 16 possible. In an additional alternate embodiment, there is no actuated valve 20 between the recycling apparatus 21 and the vent system, such that flow is always possible.

When fluid connection between the recycling apparatus 21 and the furnace 10 is established, a portion of the atmosphere gas can be caused to flow towards the recycling apparatus 21, where it is divided into a purified stream that flows to storage volume 22, and an impure stream that communicates with one or more of the atmosphere vent(s) 16 and the recycled fuel conduit(s) 15. If the furnace 10 must be operated at a different pressure than the gas storage volume 22, then a pressure reducing device, such as a forward pressure regulator 23, can be provided. This facilitates the use of the gas storage volume at a first maximum storage pressure, while the furnace 10 operates at a second, lower operating pressure.

Because a portion of the atmosphere gas is lost as impure gas from the recycling apparatus 21, a makeup stream of atmosphere gas is still needed from the supply 11. The atmosphere supply has a primary pressure regulator 24 that is provided with a primary evaporator 27 if the supply is via cryogenic liquefied gas. The set pressure of the pressure regulator 24 is advantageously set lower than the setpoint of the pressure regulator 23. In this way, recycled atmosphere gas is preferentially used at the first, higher set pressure until the gas pressure in the storage volume 22 falls below the set pressure of the valve 23. If atmosphere gas flow must continue at this point, flow continues from the storage vessel 22, reducing its pressure until flow of fresh atmosphere gas from the supply 11 occurs through the primary pressure regulator 24. In this way, the usage of atmosphere gas from the supply 11 is minimized.

If the atmosphere supply 11 is a cryogenic tank having a liquid portion 29 and a gas portion 30, and the flow through the valve 24 is minimized, the pressure in the supply tank 11 will rise due to evaporation of the liquefied gas. If this pressure becomes great enough, the gas will be exhausted through the safety relief valve 26. If the cryogenic tank 11 is supplied with an economizer valve 25 which has a set pressure above that of valve 24, but below that of safety valve 26, then gas will flow through economizer 25 and supplementary heater 28, if equipped. To prevent waste of purchased atmosphere gas, the delivery pressure from valve 23 is thus desirably below that of valve 25, so that this evaporated atmosphere gas can be preferentially used instead of the recycled atmosphere gas that can be stored in gas storage volume 22. Thus, it is desirable that the set pressure of the recycled atmosphere gas regulator 23 is lower than the set pressure of the economizer 25, but above that of the primary atmosphere supply valve 24.

The recycled atmosphere storage volume is provided with a safety valve 31, which establishes the maximum amount of recycled gas that can be stored before venting. When the atmosphere recycle storage volume nears the set pressure of the safety valve 31, the flow of recycled atmosphere gas can be reduced by increasing the amount of vented atmosphere recycled as fuel or released to vent 16. Alternatively, venting through safety 31 can occur. Alternatively, the volume of the recycled atmosphere storage can be chosen to minimize or eliminate the occurrence of pressures higher than the set pressure of safety 31.

The recycling apparatus 21 can generate atmosphere gas that is of any purity. In one embodiment, the recycled atmosphere gas can be of a higher purity than the makeup atmosphere gas from the gas supply 11. An example of this situation is reducing gas supply from dissociation of ammonia, where the nominal makeup gas composition is 75% $H_2$ and 25% $N_2$ with traces of unreacted ammonia. The recycled gas can have a substantial fraction of the nitrogen species removed, such that the recycled fraction actually enriches the atmosphere in hydrogen. This advantageously reduces the chemical potential for nitriding the material being treated, a potentially undesirable side reaction during heat treating.

Figure 3A:
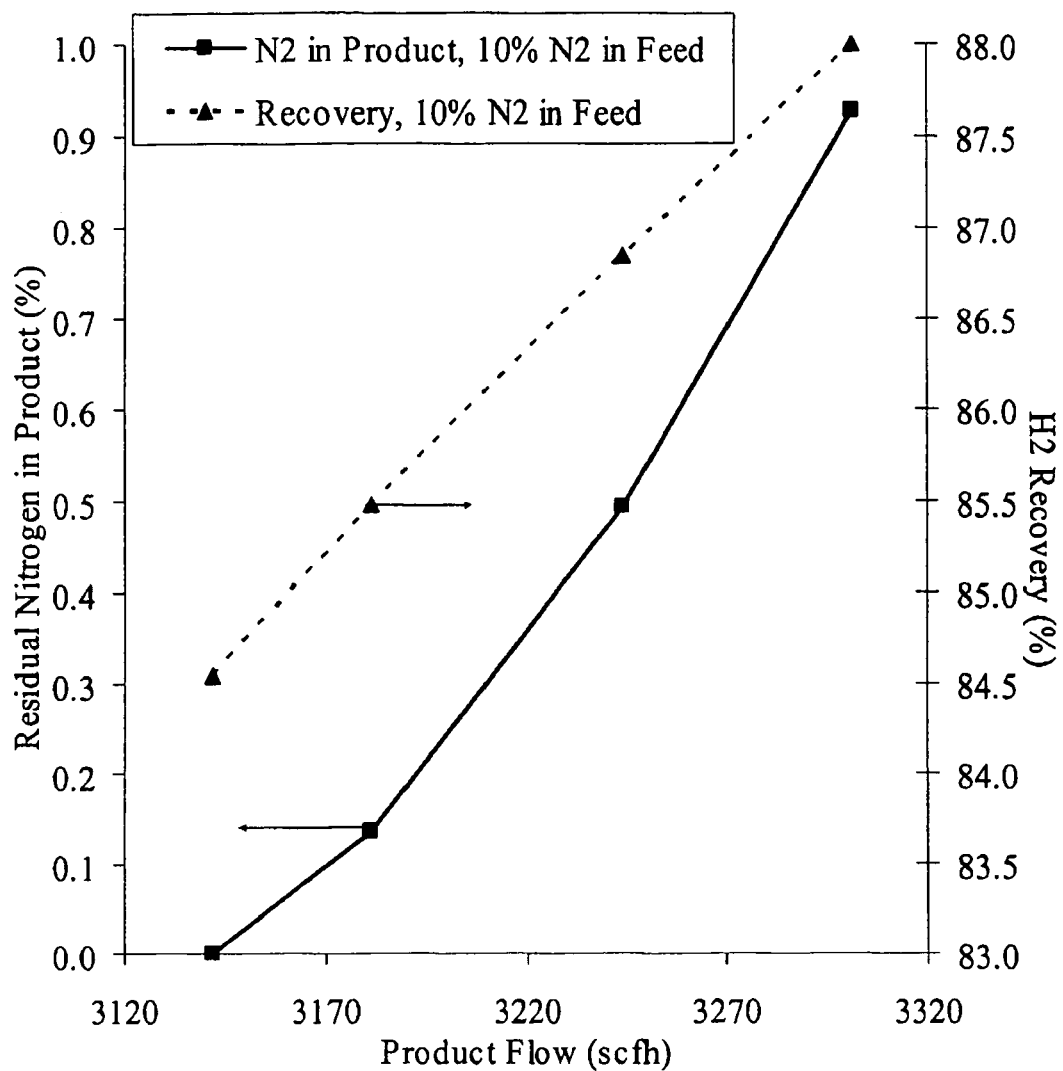
FIGS. 3a through 3c show the trend in product flow versus recovery and purity for one particular application of the atmosphere recycling apparatus to hydrogen purification with three different contamination levels in the feedgas.
Figure 3B:
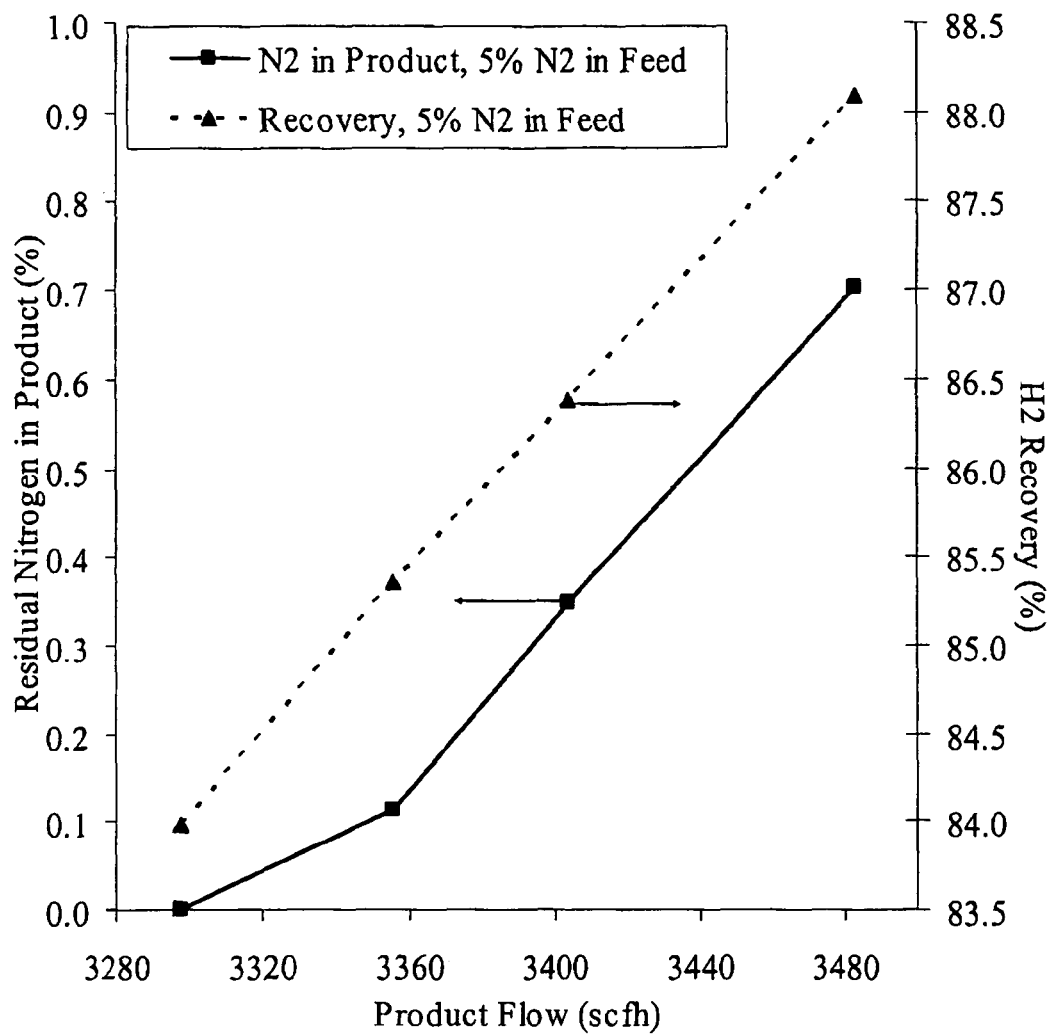
Figure 3C:
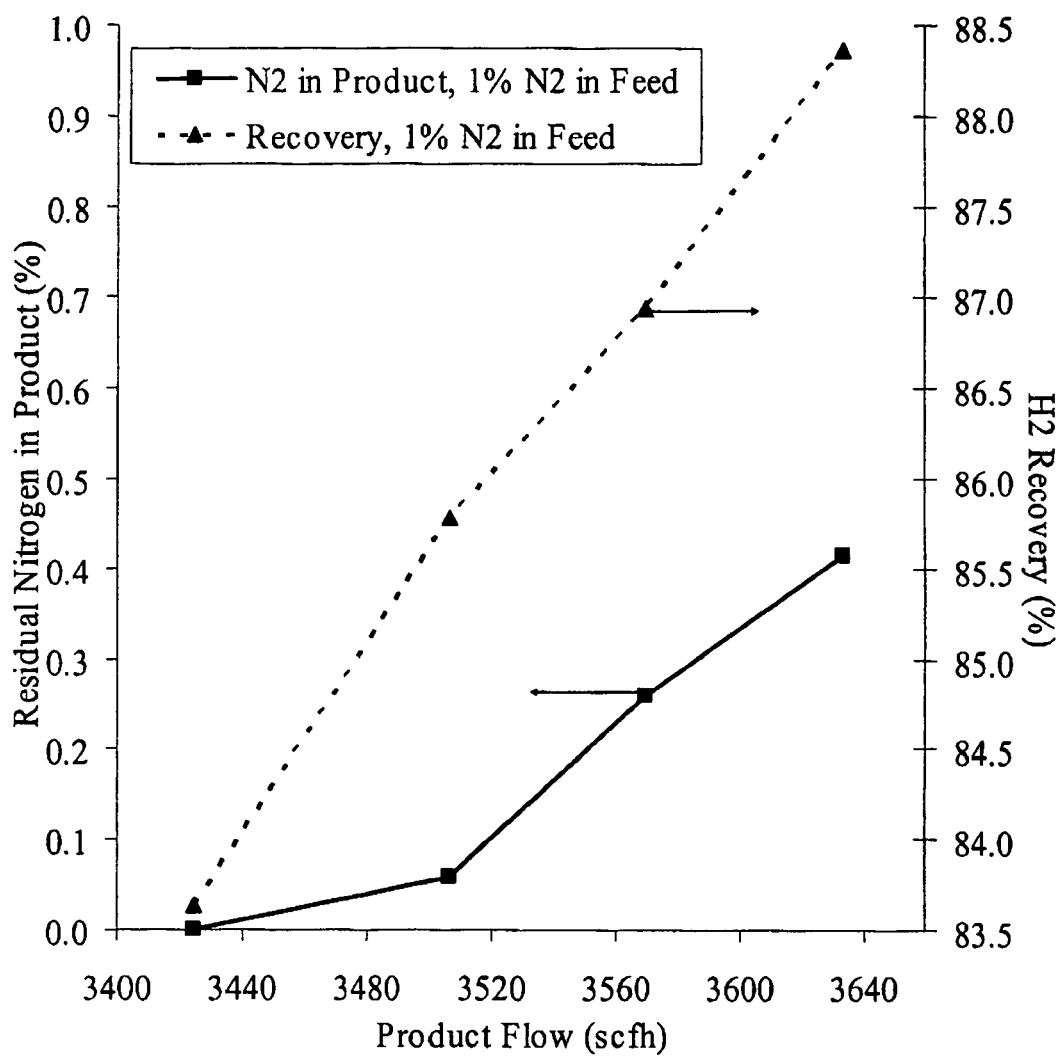

Alternatively, the recycled gas can have a lower purity than the supplied atmosphere gas. An example of this situation is the makeup supply through purified cryogenic gas, such as liquid hydrogen. Liquified hydrogen generally is supplied with less than 50 ppm of total impurities. The recycling apparatus 21 can receive vented atmosphere gas that is contaminated with nitrogen from the ambient air or from the furnace inert purge gas. The recycling apparatus can be controlled to remove substantially all of the impurities from the vented atmosphere gas. FIGS. 3a through 3c show calculated performance curves for one particular application of the recycling apparatus where the fraction of hydrogen atmosphere gas recovered declines as the desired impurity level is reduced. FIG. 3a depicts the case where the incoming vented atmosphere is contaminated with 10% $N_2$, FIG. 3b depicts the case where the incoming vented atmosphere is contaminated with 5% $N_2$, and FIG. 3c depicts the case where the incoming vented atmosphere is contaminated with 1% $N_2$. If the metal being heat treated is not adversely affected by a small amount of recycled nitrogen, the fraction of recycled gas can be desirably increased at the expense of a small decrease in purity. FIGS. 3a through 3c demonstrate that a desired purity target, such as that measured through composition analyzer 32, can result in improved hydrogen product flowrate and recovery if the incoming vented atmosphere is contaminated with a lower amount of the undesired component(s).

In one embodiment, a gas purity analyser 32 can be attached through a sample line 33 to the atmosphere feed to the furnace 10, through a sample line 34 to the recycled atmosphere from the recycling apparatus 21, or via a sampling line 35 in fluid connection with the well-mixed furnace atmosphere or it's vent piping. The purity of the recycled atmosphere gas can be varied by the recycling apparatus 21 in response to a signal from the analyser 32 to meet a desired concentration at any of these locations, or at more than one by sequentially sampling each location or by providing more than one analyser 32.

In another embodiment, the purity of the atmosphere gas can be varied throughout the heat treatment cycle, such that relatively impure gas is used when temperatures are low and adverse reactions such as nitriding are unlikely, but can be increased when temperatures and the risk of adverse reactions between the atmosphere and the material being treated are higher.

Figure 4:
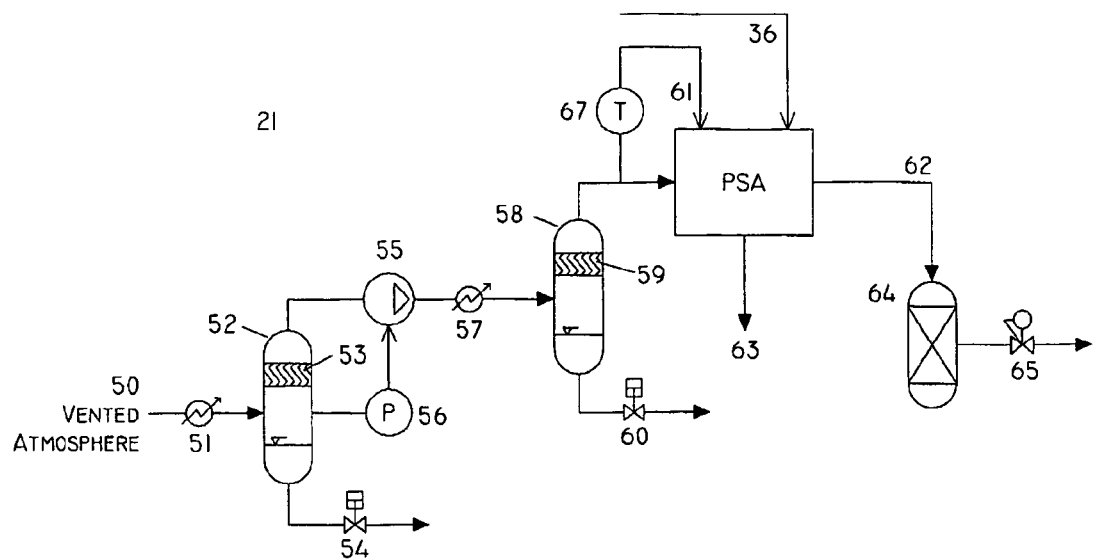
FIG. 4 depicts a detailed schematic flow diagram of an embodiment of an atmosphere recycling apparatus according to the present invention.

FIG. 4 depicts an embodiment of the atmosphere recycling apparatus 21 that accepts an impure, vented atmosphere gas 50. This impure, vented gas can be at an elevated temperature, and can be cooled in a cooler 51. This and other coolers of any type, such as liquid cooled, air-cooled, refrigerant-cooled, etc., can be used. The cooled, impure atmosphere gas will probably contain condensed liquid as an aerosol and/or a liquid stream. This liquid is separated in an inlet buffer 52, which is provided with a mist eliminator 53, and facilitates the removal of the condensed liquid via valve 54. Alternatively, the mist separation 53, condensate removal 54 and gas buffer 52 can be performed in separate equipment. The condensed liquid will contain a portion of the residual hydrocarbons that would otherwise be exhausted into the atmosphere as volatile organic compounds, a form of air pollution.

The substantially liquid-free impure gas will then flow to at least one compressor 55, or plural compressors in series. The compressor is selected from the known types of compressors in order to meet the desired operating conditions. The compressor can have one or more stages of compression and intercooling, and it can be driven by any means, for example electric motor, air motor, hydraulic motor, combustion engine. A particularly energy-efficient means of powering the compressor is via vented atmosphere gas from one or more of the waste atmosphere gas streams if they are combustible, such as in the case of a hydrogen atmosphere. This can be done via direct combustion in a reciprocating engine or gas turbine, or indirectly via a steam turbine with steam raised by the vented atmosphere gas.

The impure atmosphere gas exits the compressor at an elevated pressure and temperature, and must be cooled in a cooler 57. Because the total pressure of the atmosphere gas is increased, the partial pressure of condensable vapors is increased. This can result in further condensation of volatile organics and any water vapor that is present. These can be separated in a gas buffer 58, which is provided with a mist eliminator 59 and a condensate removal valve 60. As with the inlet side of the compressor, these functions alternatively can be conducted in separate pieces of equipment. The substantially liquid-free impure atmosphere gas is then directed to a separator 61. In this embodiment, the separator is at least one PSA apparatus. Alternative embodiments exist for some atmosphere gases with specific impurities, including permselective membranes. Further, such membranes can be combined with PSAs to achieve hybrid separations. These configurations can extend to complex fractionations using one or more separations of each type in series and or parallel, with the purified atmosphere recovered at an intermediate pressure with or without subsequent repressurization.

The gas separator 61 produces a purified atmosphere gas stream 62 and an impure stream 63. For the case of a PSA separator recovering hydrogen, helium or nitrogen, the purified product stream is at an elevated pressure that can be almost as high as the compressor discharge pressure. The impure stream 63 is then at low pressure. For pressure-driven separations such as PSA or permselective membranes, a vacuum can be applied to the stream 63 to enhance fractional recovery, product purity, or equipment output, or to simultaneously increase all of these. The purified atmosphere gas stream 62 can be provided with a buffer tank 64 in order to minimize pressure fluctuations. This configuration is especially desirable in the embodiment where a PSA gas separator is used. Further, a backpressure regulator 65 can be used to impose a constant backpressure condition on the separation device. Finally, the purified atmosphere gas stream 66 is recycled to the storage volume 22 in FIG. 2.

Any PSA gas separator can be used that is suitable for removal of the impurities in the impure atmosphere gas. The selection of appropriate PSA adsorbents for removing key impurities is known in the art. An example of appropriate adsorbents for removing impurities from a hydrogen atmosphere are silica gel and/or activated alumina to remove water vapour and heavy hydrocarbons, if present. Activated carbon can be used to remove hydrocarbons and carbon oxides. Activated carbon can also be used to remove nitrogen, oxygen, and carbon monoxide, although aluminasilicate zeolites are also effective.

The separation efficiency and purity of the recycled atmosphere gas 62 is a function of the separation apparatus. For a PSA apparatus, the choice of the frequency with which the valve sequence functions can be used to vary the product purity for a given apparatus size and adsorbent characteristics. Therefore, when the control signal 36 from the gas purity analyzer 32 indicates that the purity is below the desired target value, the frequency with which the PSA cycle operates is increased to increase the purity. This results in a greater proportion of waste atmosphere gas as well, which is then either vented or used as fuel gas. If the recycled gas has lower impurities than the target value, the frequency of the PSA cycle is reduced, increasing the impurity level but also increasing the proportion of the atmosphere gas which is recycled.

In the alternative embodiment where no gas purity analyzer is employed, the PSA valve cycle frequency can be held constant. This will result in variations in purity with impure atmosphere gas flowrate to the PSA as well as with the impurity levels in the impure atmosphere gas. Alternatively, the PSA valve cycle frequency can be varied with the impure atmosphere gas flowrate. This flowrate can be measured with a flowmeter or, alternatively, it can be assumed proportional with the speed of the compressor 55. The speed of the compressor 55 can be varied in order to hold the pressure measured by pressure sensor 56 in fluid contact the inlet gas buffer essentially-constant. In this embodiment, variations in atmosphere flow through the at least one heat treatment furnace 10 can be compensated for by the compressor speed variations. In the alternative embodiment where the compressor speed is constant, the flow will remain essentially constant as long as the furnace pressure is maintained essentially-constant by the backpressure valve 14. This advantageously reduces complexity, but results in a system which recovers a smaller total amount of atmosphere gas. The compressor also can be advantageously provided with a bypass valve between the discharge and the suction that provides a recirculation bypass to allow the compressor to idle. This configuration allows processing lower flows than afforded by the minimum permissible speed of the compressor 55. In fact, this bypass valve allows continuous idling of the compressor 55 at zero net flow, facilitating rapid return to flow conditions.

The flow rate control methods above can be combined with the use of valve unloaders. Thus, at the minimum speed of the compressor, further modulation of vented atmosphere flow rate can be achieved by actuating suction or discharge valve unloader devices. Thus, the modulation of flow rate contemplated here can be purely based on speed, or can be based upon capacity controls such as valve unloaders or suction throttling. Further, this modulation can be continuous, or it can be discontinuous, as is achieved by the use of two speed motors or by the use of one or more sets of unloader valves provided in the compressor 55. When the discontinuous modulation is employed, a corresponding discontinuous change in PSA valve cycle time can also be employed to attain the correct recycled atmosphere purity as in the embodiment where the changes are essentially continuous.

In any embodiment using a PSA, the PSA adsorbent performance will be dependent upon the impure atmosphere feedgas temperature. High temperatures reduce the capacity of the adsorbents in the PSA for impurity vapors, thus resulting in lower recycled gas purity. Colder temperatures result in higher adsorption capacity, and thus purity is correspondingly increased at the same valve cycle frequency. Temperature sensor 67 can be used as a control input to the PSA gas separator 61. Higher temperatures correspond to higher valve switching frequencies, while lower temperatures facilitate lower frequencies and higher fractional recovery of the atmosphere gas. The combination of valve frequencies that are proportional to flowrate based on compressor 55 speed and adjusted on the basis of feedgas temperature 67 provides a simple control strategy for the PSA separator 61 that maximizes fractional recovery at a desired purity level to compensate for variations in feedgas flowrate and temperature. This embodiment desirably decreases cost compared to the use of the gas analyser 32, but undesirably does not prevent recycled atmosphere purity fluctuations due to fluctuations in impurity levels in the impure atmosphere gas feed, such that neither embodiment is preferred in all situations.

The present invention can be used for recycling components of the atmosphere used in heat treatment processes, for example, in metallurgical processes or semiconductor processes.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A system for recycling a vented atmosphere gas discharged from a heat treatment chamber utilizing a protective atmosphere gas therein, said system comprising:
    an atmosphere recycling apparatus to receive the vented atmosphere gas, said atmosphere recycling apparatus including a gas separator to separate the vented atmosphere gas into a purified atmosphere gas stream and an impure stream, wherein said atmosphere recycling apparatus feeds the purified atmosphere gas stream to the heat treatment chamber and feeds the impure stream as fuel to the heat treatment chamber.

2. The system according to claim 1, further comprising a storage vessel to receive the purified atmosphere gas stream from said atmosphere recycling apparatus and to supplement an atmosphere gas supply to the heat treatment chamber with the purified atmosphere gas stream.

3. The system according to claim 2, further comprising:
    a primary pressure regulator provided in between the atmosphere gas supply and the heat treatment chamber; and
    a forward pressure regulator provided in between said storage vessel and the heat treatment chamber,
    wherein said primary pressure regulator has a set pressure that is lower than a set pressure of said forward pressure regulator.

4. The system according to claim 3, further comprising an economizer valve provided in between the atmosphere gas supply and the heat treatment chamber, wherein said forward pressure regulator has a set pressure that is lower than a set pressure of said economizer valve.

5. The system according to claim 4, wherein the set pressure of said forward pressure regulator is above the set pressure of said primary pressure regulator.

6. The system according to claim 2, wherein said atmosphere gas supply is a cryogenic tank having a liquid storage portion and a gas storage portion.

7. The system according to claim 6, wherein said cryogenic tank includes a safety relief valve connected to said gas storage portion thereof.

8. The system according to claim 7, further comprising:
a first supply path connected to said liquid storage portion of said cryogenic tank to supply atmosphere gas to the heat treatment chamber; and
a second supply path connected to said gas storage portion of said cryogenic tank to supply atmosphere gas to the heat treatment chamber.

9. The system according to claim 8, wherein said first supply path includes a primary pressure regulator and a primary evaporator, and wherein said second supply path includes an economizer valve and a supplementary heater.

10. The system according to claim 1, further comprising:
a gas purity analyzer to detect a supply purity of a supply of atmosphere gas to the heat treatment chamber, said gas purity analyzer detecting a venting purity of the vented atmosphere gas, and said gas purity analyzer detecting a recycling purity of the purified atmosphere gas stream from said atmosphere recycling apparatus, wherein said gas purity analyzer sends a signal to said atmosphere recycling apparatus to achieve a desired purity level for one or more of the supply purity, the venting purity, and the recycling purity.

11. The system according to claim 1, further comprising a mist eliminator to remove condensed liquid from the vented atmosphere gas.

12. The system according to claim 11, further comprising a gas buffer, wherein said gas buffer includes said mist eliminator.

13. The system according to claim 1, wherein said atmosphere recycling apparatus further includes one or more gas buffers.

14. The system according to claim 13, wherein said atmosphere recycling apparatus further includes a compressor connected to an outlet of a gas buffer of the one or more gas buffers, and a cooling device connected to an outlet of said compressor.

15. The system according to claim 14, wherein said compressor is powered via combustion of the vented atmosphere gas or the impure stream.

16. The system according to claim 14, wherein said atmosphere recycling apparatus further includes an additional compressor provided in series with said compressor.

17. The system according to claim 13, wherein said atmosphere recycling apparatus further includes a cooler provided in between the heat treatment chamber and said one or more gas buffers.

18. The system according to claim 1, wherein said gas separator is a permselective membrane.

19. The system according to claim 1, wherein said gas separator is a pressure swing adsorption apparatus.

20. The system according to claim 1, further comprising a cooler provided in between the heat treatment chamber and said gas separator.

21. The system according to claim 1, further comprising:
an oil separator to receive the vented atmosphere gas from the heat treatment chamber; and
a backpressure valve provided along an atmosphere vent conduit, said backpressure valve being provided downstream of said oil separator,
wherein said atmosphere recycling apparatus receives the vented atmosphere at a location upstream of said backpressure valve and downstream of said oil separator.

22. The system according to claim 21, wherein said oil separator receives vented atmosphere gas from at least one additional heat treatment chamber.

23. The system according to claim 1, wherein said atmosphere recycling apparatus selectively receives vented atmosphere gas from one or more additional heat treatment chambers, said gas separator separating the vented atmosphere gas from the heat treatment chamber and/or the one or more additional heat treatment chambers into a purified atmosphere gas stream and an impure stream, wherein said atmosphere recycling apparatus selectively feeds the purified atmosphere gas stream to the heat treatment chamber and/or the one or more additional heat treatment chambers.

24. The system according to claim 1, further comprising a backpressure valve provided along an atmosphere vent conduit.

25. The system according to claim 24, further comprising:
an actuated valve provided along a recycling conduit that connects said atmosphere vent conduit to said atmosphere recycling apparatus,
wherein said recycling conduit connects to said atmosphere vent conduit at a location upstream of said backpressure valve, and
wherein said actuated valve selectively permits fluid communication between the vented atmosphere gas from the heat treatment chamber and said atmosphere recycling apparatus.

26. The system according to claim 25, wherein said actuated valve includes a diverter valve to selectively divert all of the vented atmosphere gas from the heat treatment chamber to pass through said atmosphere recycling apparatus.

27. A method for recycling a vented atmosphere gas discharged from a heat treatment chamber utilizing a protective atmosphere gas therein, said method comprising:
receiving the vented atmosphere gas discharged from the heat treatment chamber;
separating the vented atmosphere gas into a purified atmosphere gas stream and an impure stream;
feeding the purified atmosphere gas stream to the heat treatment chamber; and
utilizing the impure stream as fuel for the heat treatment chamber.

28. The method according to claim 27, further comprising receiving the purified atmosphere gas stream in a storage vessel, and supplementing an atmosphere gas supply to the heat treatment chamber with the purified atmosphere gas stream.

29. The method according to claim 28, further comprising:
providing a primary pressure regulator in between the atmosphere gas supply and the heat treatment chamber; and
providing a forward pressure regulator in between the storage vessel and the heat treatment chamber,
wherein the primary pressure regulator has a set pressure that is lower than a set pressure of the forward pressure regulator.

30. The method according to claim 29, further comprising providing an economizer valve in between the atmosphere gas supply and the heat treatment chamber, wherein the forward pressure regulator has a set pressure that is lower than a set pressure of the economizer valve.

31. The method according to claim 30, wherein the set pressure of the forward pressure regulator is above the set pressure of the primary pressure regulator.

32. The method according to claim 28, wherein the atmosphere gas supply is a cryogenic tank having a liquid storage portion and a gas storage portion.

33. The method according to claim 32, wherein the cryogenic tank includes a safety relief valve connected to the gas storage portion thereof.

34. The method according to claim 33, further comprising:
providing a first supply path connected to the liquid storage portion of the cryogenic tank to supply atmosphere gas to the heat treatment chamber; and
providing a second supply path connected to the gas storage portion of the cryogenic tank to supply atmosphere gas to the heat treatment chamber.

35. The method according to claim 34, wherein the first supply path includes a primary pressure regulator and a primary evaporator, and wherein the second supply path includes an economizer valve and a supplementary heater.

36. The method according to claim 27, further comprising:
providing a gas purity analyzer to detect a supply purity of a supply of atmosphere gas to the heat treatment chamber, the gas purity analyzer detecting a venting purity of the vented atmosphere gas, and the gas purity analyzer detecting a recycling purity of the purified atmosphere gas stream from the atmosphere recycling apparatus, wherein the gas purity analyzer sends a signal to the atmosphere recycling apparatus to achieve a desired purity level for one or more of the supply purity, the venting purity, and the recycling purity.

37. The method according to claim 27, further comprising removing condensed liquid from the vented gas atmosphere using a mist eliminator.

38. The method according to claim 37, further comprising providing a gas buffer for the vented gas atmosphere, wherein the gas buffer includes the mist eliminator.

39. The method according to claim 27, further comprising providing one or more gas buffers including a mist eliminator to facilitate the removal of condensed liquid.

40. The method according to claim 39, further comprising providing a compressor connected to an outlet of a gas buffer of the one or more gas buffers, and a cooling device connected to an outlet of the compressor.

41. The method according to claim 40, wherein the compressor is powered via combustion of the vented atmosphere gas.

42. The method according to claim 40, further comprising providing an additional compressor provided in series with the compressor.

43. The method according to claim 27, further comprising cooling the vented atmosphere gas prior to the separating step.

44. The method according to claim 27, wherein the separation of the vented atmosphere gas into a purified atmosphere gas stream and an impure stream is performed using a permselective membrane.

45. The method according to claim 27, wherein the separation of the vented atmosphere gas into a purified atmosphere gas stream and an impure stream is performed using a pressure swing adsorption apparatus.

46. The method according to claim 45, wherein the pressure swing adsorption apparatus is operated with a valve cycle frequency that is varied in proportion to a desired flow rate of the vented atmosphere gas.

47. The method according to claim 27, further comprising:
providing an oil separator to receive the vented atmosphere gas from the heat treatment chamber; and
providing a backpressure valve provided along an atmosphere vent conduit, the backpressure valve being provided downstream of the oil separator.

48. The method according to claim 47, wherein the oil separator receives vented atmosphere gas from at least one additional heat treatment chamber.

49. The method according to claim 27, further comprising:
selectively receiving vented atmosphere gas from one or more additional heat treatment chambers;
separating the vented atmosphere gas from the heat treatment chamber and/or the one or more additional heat treatment chambers into a purified atmosphere gas stream and an impure stream; and
selectively feeding the purified atmosphere gas stream to the heat treatment chamber and/or the one or more additional heat treatment chambers.

50. The method according to claim 27, further comprising providing a backpressure valve along an atmosphere vent conduit connected to the heat treatment chamber.

51. The method according to claim 50, further comprising providing an actuated valve to selectively permit fluid communication between the vented atmosphere gas from the heat treatment chamber and an atmosphere recycling apparatus to perform the separating step.

52. The method according to claim 51, wherein the actuated valve includes a diverter valve to selectively divert all of the vented atmosphere gas from the heat treatment chamber to pass through the atmosphere recycling apparatus.

53. The method according to claim 27, wherein the separating step is performed using a gas separator, and further comprising maintaining a desired flow rate of vented atmosphere gas at an inlet of the gas separator despite variations in atmosphere gas supply flow rate to the heat treatment chamber.

54. The method according to claim 53, wherein the maintaining step includes providing a backpressure valve along an atmosphere vent conduit connected to the heat treatment chamber, and providing fluid communication between the gas separator and the atmosphere vent conduit at a location along the atmosphere vent conduit upstream of the backpressure valve.

55. The method according to claim 53, wherein the maintaining step includes:
providing a gas buffer to receive the vented atmosphere gas from the heat treatment chamber;
providing a compressor connected to an outlet of the gas buffer; and
varying the speed of the compressor in order to maintain a constant pressure in the gas buffer.

56. The method according to claim 55, wherein the compressor is provided with a bypass valve between a discharge side and a suction side thereof.

57. The method according to claim 55, wherein the maintaining step further includes providing the compressor with an actuatable valve unloader to modulate flow rate of gas traveling therethrough in order to maintain the desired flow rate of vented atmosphere gas at the inlet of the gas separator.

58. The method according to claim 27, wherein the separating step is performed using a gas separator, and further comprising controlling a flow rate of vented atmosphere gas at an inlet of the gas separator in order to control a purity of the purified atmosphere gas stream and/or a purity of the impure stream.

* * * * *